United States Patent [19]
Nakanishi

[11] Patent Number: 6,047,195
[45] Date of Patent: Apr. 4, 2000

[54] SOUND VOLUME SETTING DEVICE FOR A PORTABLE TELEPHONE

[75] Inventor: Toshiaki Nakanishi, Yokohama, Japan

[73] Assignee: Kyocera Corporation, Kyoto, Japan

[21] Appl. No.: 08/694,308

[22] Filed: Aug. 8, 1996

[30]        Foreign Application Priority Data

Aug. 25, 1995   [JP]   Japan .................................. 7-240797

[51] Int. Cl.⁷ ...................................................... H04Q 7/32
[52] U.S. Cl. ........................... 455/552; 455/567; 455/426
[58] Field of Search .................................. 455/550, 552, 455/567, 403, 422, 426, 434, 458, 461

[56]                References Cited

U.S. PATENT DOCUMENTS

| | | | |
|---|---|---|---|
| 5,235,632 | 8/1993 | Raith | 455/449 |
| 5,337,356 | 8/1994 | Shinozaki | 455/567 X |
| 5,448,620 | 9/1995 | Gershkovich et al. | 455/552 |
| 5,479,476 | 12/1995 | Finke-Anlauff | 455/550 |
| 5,606,597 | 2/1997 | Newland | 455/567 X |
| 5,778,304 | 7/1998 | Grube et al. | 455/422 |

*Primary Examiner*—Dwayne D. Bost
*Assistant Examiner*—William G. Trost
*Attorney, Agent, or Firm*—Loeb & Loeb, LLP

[57]                ABSTRACT

In a sound volume setting device for a portable telephone which can exchange messages through a public base station and which can exchange messages through a home telephone as a base station, a service detector for detecting whether the portable telephone is under the service of a public base station or under the service of a base station of a home telephone is provided so as to always search the service state, and adjust the amplifications of an amplifier for a receiving speaker and an amplifier for a calling speaker automatically using an operating portion, to thereby set the volumes of a calling sound and a receiving speech sound at proper values in accordance with the service state.

12 Claims, 3 Drawing Sheets

SOUND VOLUME SETTING DEVICE FOR A PORTABLE TELEPHONE

BACKGROUND OF THE INVENTION

The present invention relates to a sound volume setting device for automatically adjusting a volume of a calling sound and a receiving speech sound of a portable telephone which can communicate through a public base station (cell station) or a base station of a home telephone. Examples of telephones to which the present invention can be applied are PHS (Personal Handy-phone System) terminals, cellular cordless telephones, and so on.

Conventionally, a PHS portable telephone is capable of communicating with a remote person through the nearest public base station outdoors, and through a home telephone as a home base station indoors. Generally, a PHS portable telephone automatically informs a system at all times, through a control channel, of the service area where the PHS telephone is by using data such as ID. In some cases, PHS telephones give information to each other.

Since a user carries a PHS porable telephone when the user uses it outdoors, the user usually sets its calling sound small, while, since the user often separates the telephone from the user's body when the user uses it indoors, the user sets the calling sound large. In addition, since a large noise often comes from surroundings (back noise) outdoors, the user generally sets the volume of its receiving speech sound large, and since it is often calm indoors, the user generally sets the volume of the receiving speech sound small.

In addition, as a conventional technique to adjust the volume of a receiving speech sound automatically, there is a method where the sound volume of surrounding noises is detected, and the volume of a receiving speech sound is adjusted automatically in accordance with the detection signal.

In addition, as for the adjustment of the volume of a calling sound, there is a method of increasing the sound volume as time passes, that is, as the number of times of a calling sound increases.

However, as mentioned above, it is very troublesome to set the volume of a receiving speech sound and the volume of a calling sound manually on all such occasions outdoors and indoors. In addition, there has been a problem that the method where the sound volume of surrounding noises is detected requires a large device and a high cost, and a method of increasing the volume of a calling sound as time passes causes a trouble such as a nuisance to others when there is a call in the crowd.

SUMMARY OF THE INVENTION

Taking the foregoing problems into consideration, the present invention has an object to provide a sound volume setting device for a portable telephone for setting the volumes of a receiving speech sound and a calling sound to proper values automatically in accordance with the change of surroundings between outdoor and indoor.

In order to achieve the foregoing object, according to the present invention, a sound volume setting device for a portable telephone which can exchange messages through a public base station and which can exchange messages through a home telephone as a home base station, comprises: a service detection means for detecting whether the portable telephone is in a service area of a public base station or in a service area of a home telephone as a home base station; and a sound volume setting means for always searching a service state so as to automatically setting the volume of a calling sound and/or a receiving speech sound in accordance with the service state.

In the above sound volume setting device according to the present invention, preferably, the sound volume setting means sets the volume of a calling sound small and the volume of a receiving speech sound large when the portable telephone receives a public base station.

In the above sound volume setting device according to the present invention, preferably, the sound volume setting means sets the volume of a calling sound large and the volume of a receiving speech sound small when the portable telephone receives a home telephone as a home base station.

According to the present invention, a sound volume setting device for a portable telephone which can exchange messages through a public base station and which can exchange messages through a home telephone as a home base station, comprises: a service detection means operatable in either one of a public mode for detecting whether the portable telephone is in a service area of a public base station or not, and a home mode for detecting whether the portable telephone is in a service area of a home telephone as a home base station or not; and a sound volume setting means for automatically setting the volume of a calling sound and/or a receiving speech sound in accordance with the operating mode of the service detection means.

In the above sound volume setting device according to the present invention, preferably, the sound volume setting means sets the volume of a calling sound small and the volume of a receiving speech sound large when the service detection means is set in the public mode.

In the above sound volume setting device according to the present invention, preferably, the sound volume setting means sets the volume of a calling sound large and the volume of a receiving speech sound small when the service detection means is set in the home mode.

In the sound volume setting device for a portable telephone having such a configuration as mentioned above, the sound volume is set automatically, so that it is not necessary for a user to adjust the sound volume manually every time when the surroundings change unlike the conventional case; so that the user can obtain a portable telephone convenient in use.

BRIEF DESCRIPTION OF THE INVENTION

DETAILED DESCRIPTION OF THE PREFERRED EMBODIMENTS

Figure 1:
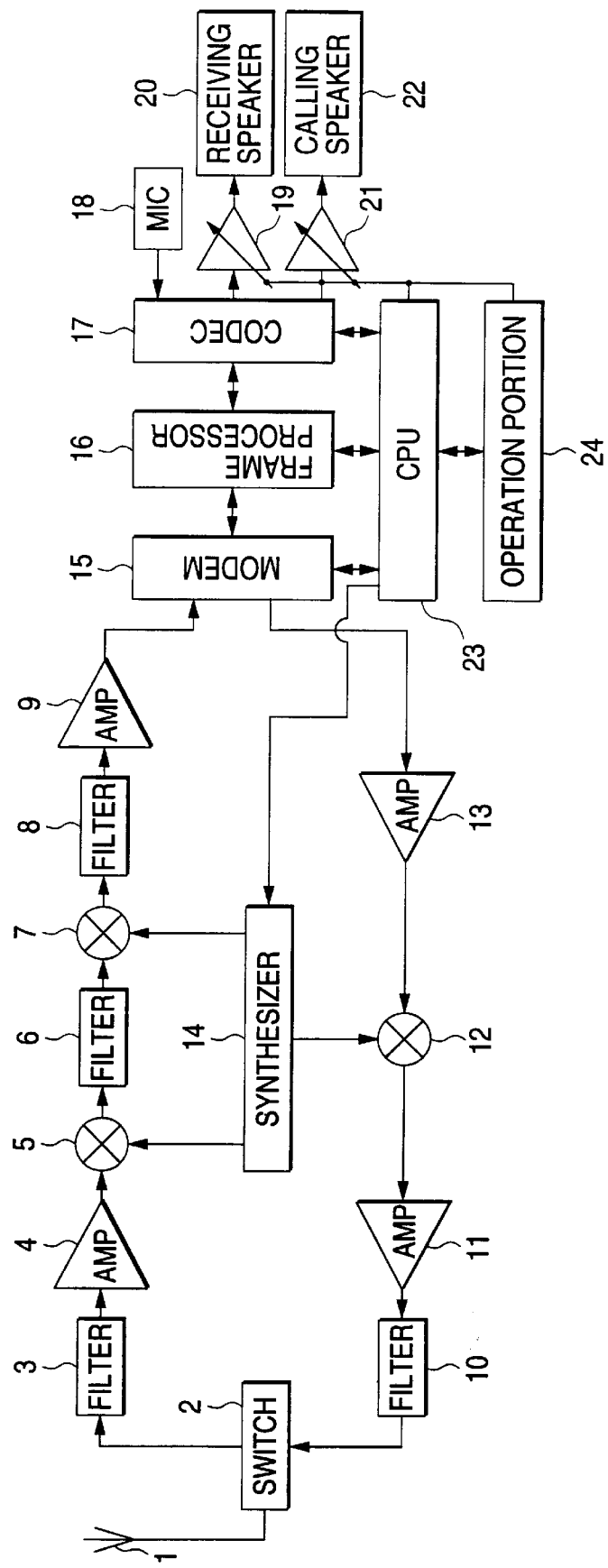
FIG. 1 is a block diagram illustrating the configuration of a sound volume setting device for a portable telephone.

An embodiment of the present invention will be described with reference to the drawings. FIG. 1 is a block diagram illustrating the configuration of a sound volume setting device for a portable telephone according to the present invention. As illustrated, this portable telephone has an antenna 1, a switch 2, a filter 3, an amplifier 4, a mixer 5, a filter 6, a mixer 7, an amplifier 9, a filter 10, an amplifier 11, a mixer 12, an amplifier 13, a synthesizer 14, a modem 15, a frame processor 16, a codec 17, a microphone 18, an amplifier 19, a receiving speaker 20, an amplifier 21, a calling sound speaker 22, a CPU (Central Processing Unit) 23, and an operating portion 24.

The antenna 1 serves to make communication with a public base station and a home telephone as a home base station. The switch 2 serves to change over the operation mode of the antenna 1 between transmission and reception. A reception signal received by the antenna 1 passes the switch 2 and the filter 3 and is amplified in the amplifier 4. Then, the signal is subjected to first frequency conversion in the mixer 5 with a frequency generated from the synthesizer 14. The converted signal passes the filter 6, and is subjected to second frequency conversion in the mixer 7. The converted signal from the mixer 7 passes the filter 8, is amplified in the amplifier 9, and demodulated in the modem 15. The demodulated reception signal is processed frame by frame by the frame processor 16, decoded in the codec 17, and outputted as sound from the receiving speaker 20 through the amplifier 19.

An aural signal outputted from the microphone 18 is encoded in the codec 17, processed frame by frame by the frame processor 16, and modulated in the modem 15. The modulated transmission signal is amplified in the amplifier 13, converted into an output frequency by the mixer 12, amplified in the amplifier (power amplifier) 11, and outputted through the filter 10, the switch 2 and the antenna 1.

The portable telephone communicates at all times with a public base station or a base station of a home station through the antenna through a control channel so as to inform the system of its existing place (service area). The CPU 23 controls the synthesizer 14, the modem 15, the frame processor 16 and the codec 17 and controls the whole of the portable telephone in accordance with a signal from the operating portion 24.

The CPU 23 is set in a search mode by the operating portion 24. The search mode includes a public mode to search the service area of a public base station, a home mode to search the service area of a base station of a home telephone, and a dual mode to search both the service areas. The CPU 23 searches a control channel of a public base station when the public mode is set up, searches a control channel of a home base station when the home mode is set up and searches both the control channels alternately when the dual mode is set up, and waits a call.

A calling sound is outputted from the calling sound speaker 22 through the amplifier 21. The amplifier 19 for the receiving speaker 20 and the amplifier 21 for the calling sound speaker 22 are amplifiers the amplification of which can be changed and adjusted through the operating portion 24. The operating portion 24 has an indication lamp (not-shown) for indicating a reception mode (showing which is received, a public base station or a base station of a home telephone), and an operation button (not-shown) for setting the respective amplifications of the amplifiers 19 and 21.

The amplification of the amplifier 19 of the receiving speaker 20 can be set through the operating portion 24 in communication with a public base station and in communication with a home base station, independently of each other. The amplification of the amplifier 21 of the calling sound speaker 22 can be set in the same manner. In advance, a user operates the operating portion 24 to properly set the calling sound level ($CS_{pb}$ and $CS_{hm}$) and the receiving speech sound level ($RS_{pb}$ and $RS_{hm}$). Preferably, the calling sound $CS_{pb}$ is set small and the receiving speech sound $RS_{pb}$ is large in communication with a public station, while the calling sound $CS_{hm}$ is large and the receiving speech sound $RS_{hm}$ is small in communication with a home base station.

After that, in the condition where the CPU 23 is set in the dual mode, the CPU 23 sets the volumes of the calling sound and the receiving speech sound automatically into the predetermined values every time when the portable telephone changes its place to the service area of a public base station or the service area of a base station of a home telephone. Processing in the dual mode executed in the CPU 23 will be described with reference to FIG. 2.

Figure 2:
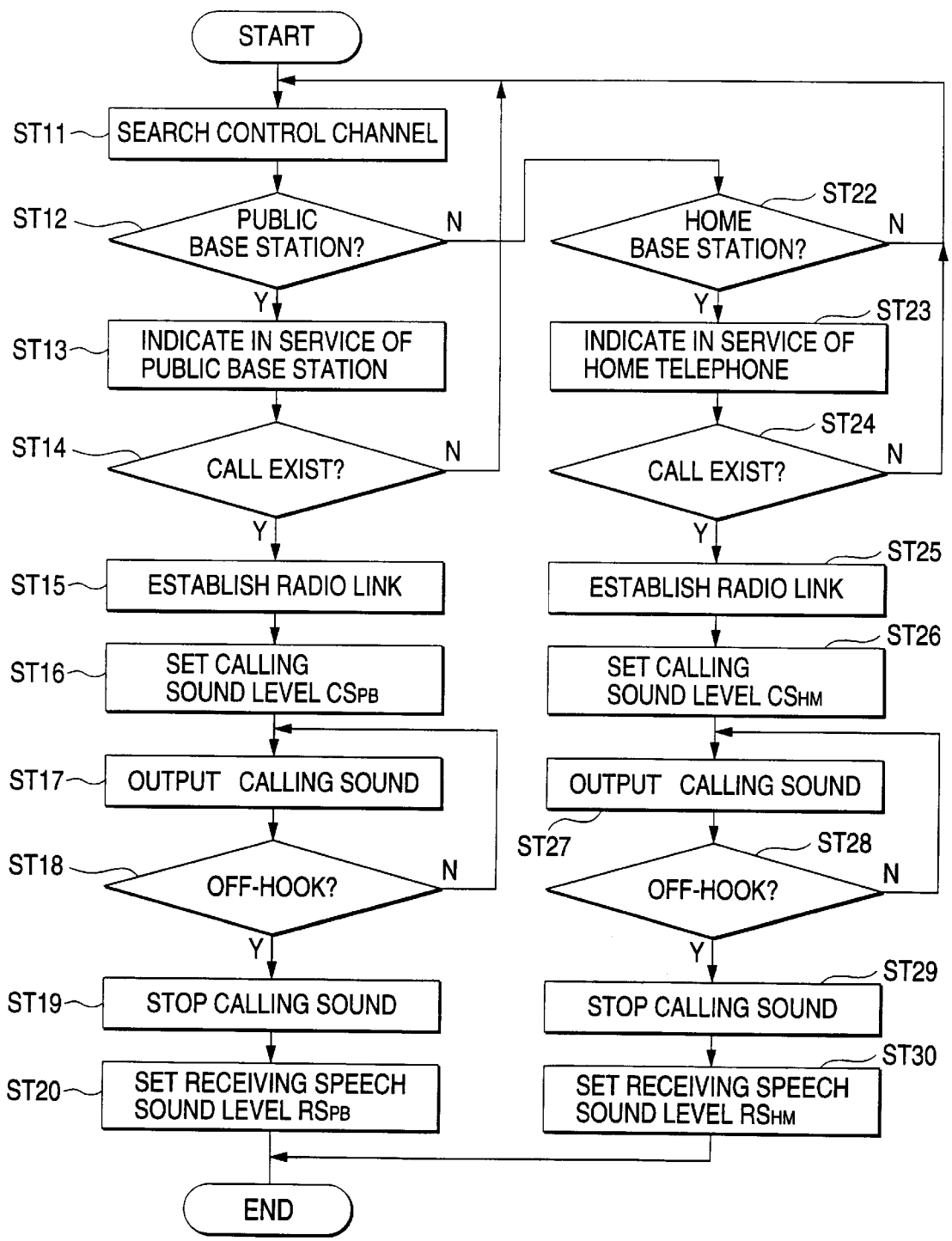
FIG. 2 is a flow chart showing a method to set the volumes of a calling sound and a receiving speech sound automatically.

FIG. 2 is a flow chart to set the volumes of the calling sound and the receiving speech sound automatically. The flow chart is executed by the CPU 23 in accordance with a program. The CPU 23 always searches a control channel (or ID) on the basis of information from the modem 15 and so on (Step ST11), and always monitors whether a public base station is in connection (Step ST12), or a base station of a home telephone is in connection (Step ST22).

When the portable telephone is in the service area of a public base station, the control channel of the public base station is connected in Step ST11, so that the CPU 23 makes an indicator (not-shown) of the operating portion 24 indicate the public base station (Step ST13), monitors whether there is a call or not (Step ST14), and the loop of the Steps ST11 to 14 is repeated till a call arrives. Upon arrival of a call, the CPU 23 establishes a radio link (Step ST15), sets the calling sound level ($CS_{pb}$) small because the control channel (or ID) belongs to a public base station (Step ST16), and outputs the calling sound out of the calling sound speaker 22 through the amplifier 21 (Step ST17). The calling sound is outputted till off-hook (Step ST18), and stops the output of the calling sound at the time of off-hook (Step ST19). Next, the receiving speech sound volume ($RS_{pb}$) is set large (Step ST20), so that talk is made through the receiving speaker 20 and the amplifier 19.

On the other hand, when the portable telephone is in the service area of a home telephone, the control channel of a base station of the home telephone is connected in Step ST11, so that the CPU 23 makes the indicator (not-shown) of the operating portion 24 indicate the home telephone (Step ST23), monitors whether there is a call or not (Step ST24), and the loop of the Steps ST11, 12, and 22 to 24 is repeated till a call arrives. Upon arrival of a call, the CPU 23 establishes a radio link (Step ST25), sets the calling sound level ($CS_{hm}$) large because the control channel (or ID) belongs to a home telephone (Step ST26), and outputs the calling sound out of the calling sound speaker 22 through the amplifier 21 (Step ST27). The calling sound is outputted till off-hook (Step ST28), and stops the output of the calling sound at the time of off-hook (Step ST29). Next, the receiving speech sound volume ($RS_{hm}$) is set small (Step ST30), so that talk is made through the receiving speaker 20 through the amplifier 19.

Figure 3:
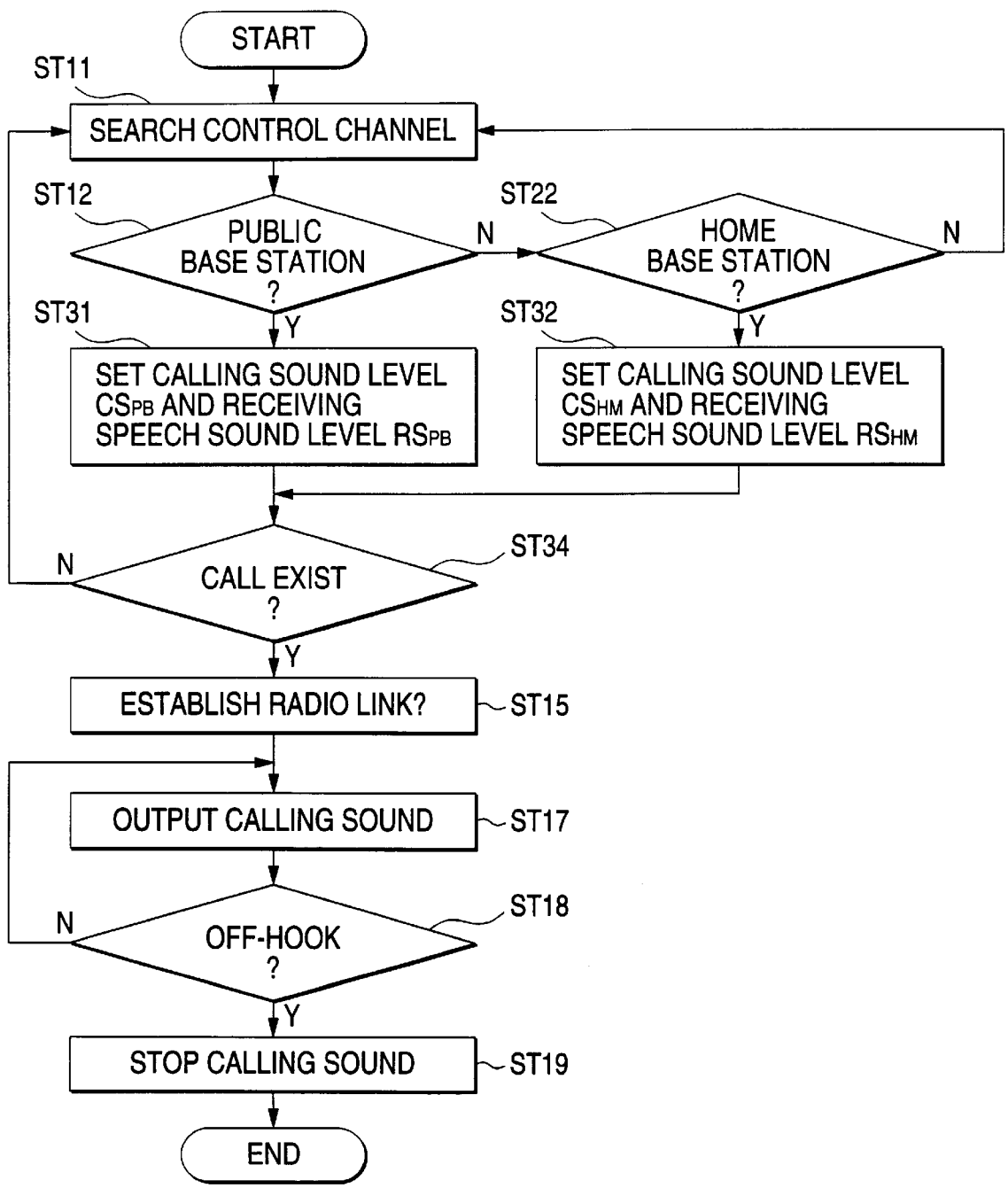
FIG. 3 is a flow chart showing another method to set the volumes according to the invention.

In the above mentioned method, the calling sound level and the receiving speech sound level are set upon receiving of calling. Alternately, according to the invention, the calling sound level and the receiving speech sound level may be set before receiving of a call as shown in FIG. 3. In this method, a control channel is searched always on the basis of information from the modem 15 (step 11). It is monitored whether a public base station is in service (step 12) or a home base station is in service (step 22).

When the portable telephone is in service area of the public base station, a calling sound level ($CS_{pb}$) is set small while a receiving speech sound level ($RS_{pb}$) is set large (step 31). On the other hand, when the portable telephone is in service area of the home base station, a calling sound level ($CS_{hm}$) is set large while a receiving speech sound level ($RS_{hm}$) is set small (step 32).

As mentioned above, when the portable telephone is used only outdoors, the portable telephone may be used in the public mode. In the same manner, when the portable telephone is used only indoors, the portable telephone may be used in the home mode. When the portable telephone is set in the public mode or the home mode, the CPU 23 obeys the set mode, or sets the amplifications of the amplifier 19 and the amplifier 21 in accordance with a control channel (or ID) in the above-mentioned manner. Therefore, in the public mode, the calling sound is outputted in a small volume, and the receiving speech sound is outputted in a large volume. In the home mode, the calling sound is outputted in a large volume, and the receiving speech sound is outputted in a small volume.

As has been described above, according to this embodiment, the calling sound is outputted in a small volume and the receiving speech sound is outputted in a large volume in a service area of a public base station (outdoors) where surrounding noises are comparatively large and where a user usually has the portable telephone with him. On the contrary, the calling sound is outputted in a large volume and the receiving speech sound is outputted in a small volume in a service area of a base station of a home telephone (indoors) where surrounding noises are comparatively small and where usually a user does not have the portable telephone with him. The above setting is performed automatically, and it is not necessary for a user to adjust the sound volume manually in accordance with surroundings in use unlike the conventional case. It is therefore possible to provide a portable telephone convenient in use.

As has been described above, according to the present invention, superior effects can be expected as follow.

Since the sound volume is set automatically in accordance with a service area, it is not necessary for a user to adjust the sound volume manually in accordance with surroundings in use every time when the surroundings change unlike the conventional case, and it is possible to provide a portable telephone convenient in use.

Since the calling sound is set in a small volume and the receiving speech sound is set in a large volume in a service area of a public base station (indoors) where surrounding noises are comparatively large and where a user usually has the portable telephone with him while the calling sound is set in a large volume and the receiving speech sound is set in a small volume in a service area of a base station of a home telephone (indoors) where surrounding noises are comparatively small and where usually a user does not have the portable telephone with him, talk can be made outdoors with a proper receiving speech sound without giving trouble to others, and indoors with a proper receiving speech sound without missing the calling sound.

What is claimed is:

1. A sound volume setting device for a dual mode portable telephone which can exchange messages through a public base station when outdoors and which can exchange messages through a home telephone as a base station when indoors, said device comprising:

a service detection means for detecting whether said dual mode portable telephone is in an outdoor service area of a public base station or in an indoor service area of a home telephone as a base station, the service detection means alternately searching between both the public base station and the home telephone as a base station; and a sound volume setting means for always searching a service area state indicating a service area that the dual mode portable telephone is in so as to automatically set al least one of a volume level of a calling sound and a volume level of a receiving speech sound in accordance with the service area that the dual mode portable telephone is in as determined by said service area state that is detected.

2. A sound volume setting device for a dual mode portable telephone according to claim 1, wherein said sound volume setting means sets the volume level of said calling sound small and the volume level of said receiving speech sound large when said dual mode portable telephone is in an outdoor service area of a public base station.

3. A sound volume setting device for a dual mode portable telephone according to claim 1, wherein said sound volume setting means sets the volume level of said calling sound large and the volume level of said receiving speech sound small when said dual mode telephone is in an indoor service area of a home telephone as a base station.

4. A sound volume setting device for a dual mode portable telephone which can exchange messages through a public base station when outdoors and which can exchange messages through a home telephone as a base station when indoors, said device comprising:

a service detection means operable in either one of a public mode for detecting whether said dual mode portable telephone is in an outdoor service area of a public base station or not, and a home mode for detecting whether said dual mode portable telephone is in an indoor service area of a home telephone as a base station or not, the service detection means alternately searching between both the public base station and the home telephone as a base station; and a sound volume setting means for automatically setting at least one of a volume level of a calling sound and a volume level of a receiving speech sound in accordance with the service area that the dual mode portable telephone is in as determined by the operating mode of said service detection means that is detected.

5. A sound volume setting device for a dual mode portable telephone according to claim 4, wherein said sound volume setting means sets the volume level of said calling sound small and the volume level of a receiving speech sound large when said service detection means is set in said public mode.

6. A sound volume setting device for a dual mode portable telephone according to claim 4, wherein said sound volume setting means sets the volume level of said calling sound large and the volume level of a receiving speech sound small when said service detection means is set in said home mode.

7. A dual mode portable telephone device which can exchange messages through a public base station when outdoors and which can exchange messages through a home telephone as a base station when indoors, said device comprising:

a service detection means for detecting whether said dual mode portable telephone is in an outdoor service area of a public base station or in an indoor service area of a home telephone as a base station, the service detection means alternately searching between both the public base station and the home telephone as a base station; and a sound volume setting means for always searching a service area state indicating a service area that the dual mode portable telephone is in so as to automatically set at least one of a volume level of a calling sound and a volume level of a receiving speech sound in accordance with the service area that the dual mode portable telephone is in as determined by said service area state that is detected.

8. A dual mode portable telephone device according to claim 7, wherein said sound volume setting means sets the volume level of said calling sound small and the volume level of said receiving speech sound large when said dual mode portable telephone is in an outdoor service area of a public base station.

9. A dual mode portable telephone device according to claim 7, wherein said sound volume setting means sets the volume level of said calling sound large and the volume level of said receiving speech sound small when said dual mode portable telephone is in an indoor service area of a home telephone base station.

10. A dual mode portable telephone device which can exchange messages through a public base station when outdoors and which can exchange messages through a home telephone as a base station when indoors, said device comprising:

a service detection means operatable in either one of a public mode for detecting whether said dual mode portable telephone is in an outdoor service area of a public base station or not, and a home mode for detecting whether said dual mode portable telephone is in an indoor service area of a home telephone as a base station or not, the service detection means alternately searching between both the public base station and the home telephone as a base station; and a sound volume setting means for automatically setting at least one of a volume level of a calling sound and a volume level of a receiving speech sound in accordance with the service area that the dual mode portable telephone is in as determined by the operating mode of said service detection means that is detected.

11. A dual mode portable telephone device according to claim 10, wherein said sound volume setting means sets the volume level of said calling sound small and the volume level of a receiving speech sound large when said service detection means is set in said public mode.

12. A dual mode portable telephone device according to claim 10, wherein said sound volume setting means sets the volume level of said calling sound large and the volume level of a receiving speech sound small when said service detection means is set in said home mode.

* * * * *